United States Patent [19]

Valcalda

[11] Patent Number: 5,248,029
[45] Date of Patent: Sep. 28, 1993

[54] BELT CONVEYOR HAVING AN AUTOMATIC BELT CENTERING DEVICE AND THE CENTERING DEVICE THEREFOR

[76] Inventor: Florent Valcalda, 81 Rue Nationale, Vaureal 95490, France

[21] Appl. No.: 851,191

[22] Filed: Mar. 13, 1992

[30] Foreign Application Priority Data

Mar. 13, 1991 [FR] France ............... 91 03154

[51] Int. Cl.⁵ .................................. B65G 39/16
[52] U.S. Cl. ........................... 198/808; 198/826
[58] Field of Search .......... 198/808, 826, 827, 830

[56] References Cited

U.S. PATENT DOCUMENTS

| 2,271,166 | 1/1942 | Weiss | 74/230.8 |
| 4,144,964 | 4/1979 | Valcalda | 198/830 |
| 4,787,504 | 11/1988 | Schultz | 198/826 |

FOREIGN PATENT DOCUMENTS

| 2319023 | 10/1974 | Fed. Rep. of Germany | 198/827 |
| 1317836 | 1/1963 | France . | |
| 2267961 | 11/1975 | France . | |
| 2593477 | 7/1987 | France . | |
| 2604700 | 4/1988 | France . | |
| 797422 | 7/1958 | United Kingdom . | |
| 1000094 | 8/1965 | United Kingdom . | |
| 1006577 | 10/1965 | United Kingdom | 198/827 |

Primary Examiner—Joseph E. Valenza
Attorney, Agent, or Firm—Thomas N. Ljungman

[57] ABSTRACT

A belt conveyor having an automatic centering device for a conveyor belt supported on flexible rollers has a central fastening for moving the rollers in curved trajectory by rotation of a pivotable lever around a fixed axis. This movement along the curved trajectory allows the toe-in of the rollers to be altered as a function of the load on the belt, to reduce the toe-in when the load increases and increase the toe-in as the load decreases.

20 Claims, 9 Drawing Sheets

FIG. 1c
PRIOR ART
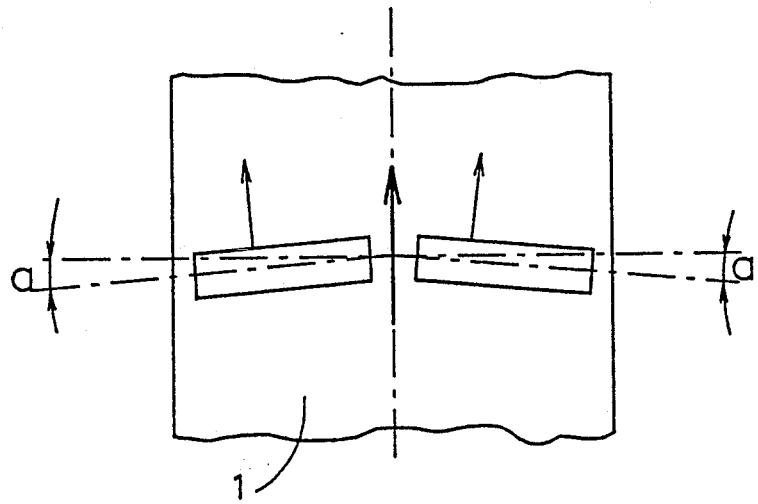
FIG. 1d
PRIOR ART
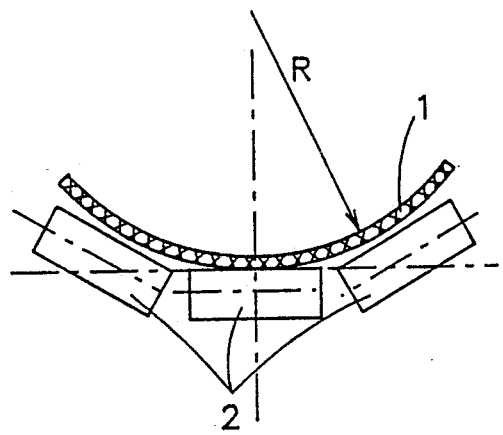
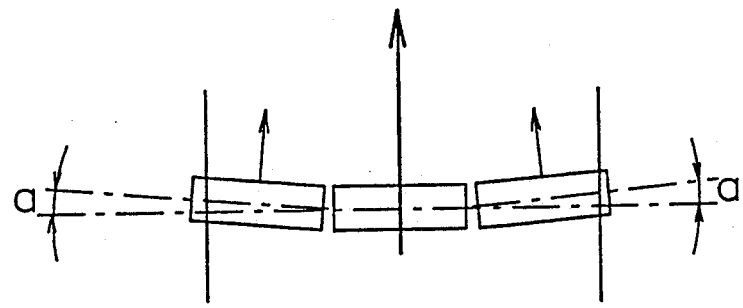
FIG. 1e
PRIOR ART FIG. 1f
PRIOR ART
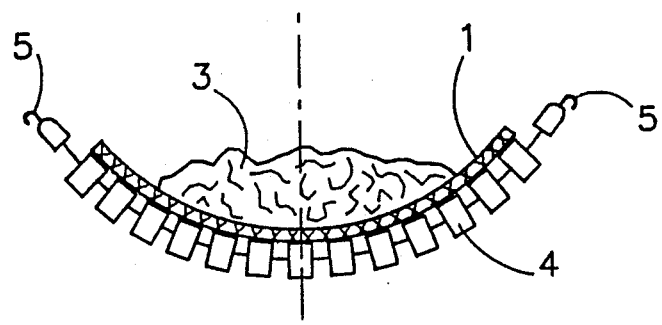
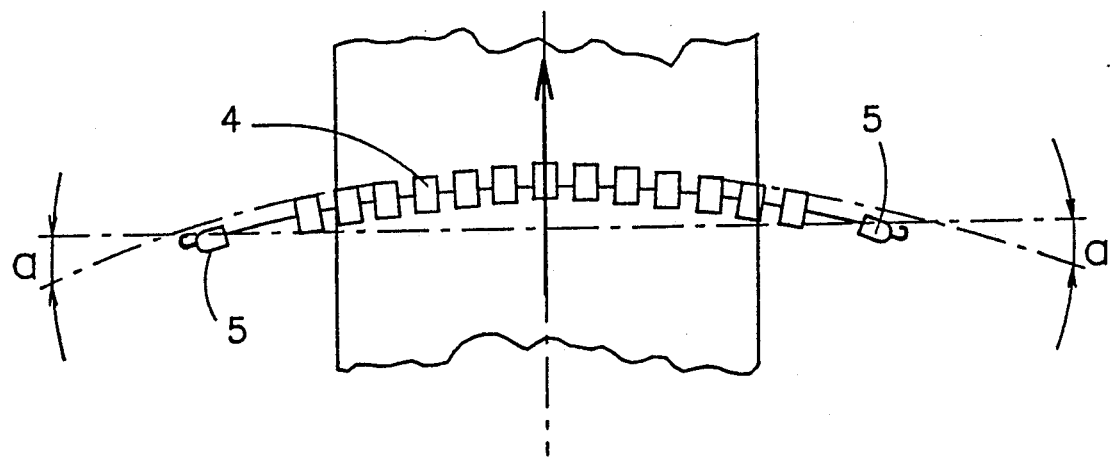
FIG. 1g
PRIOR ART FIG. 1k
PRIOR ART
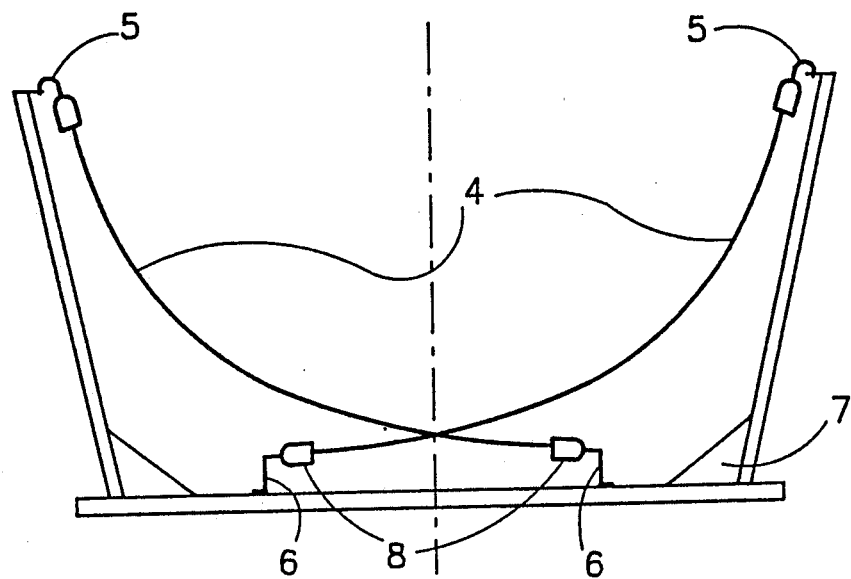
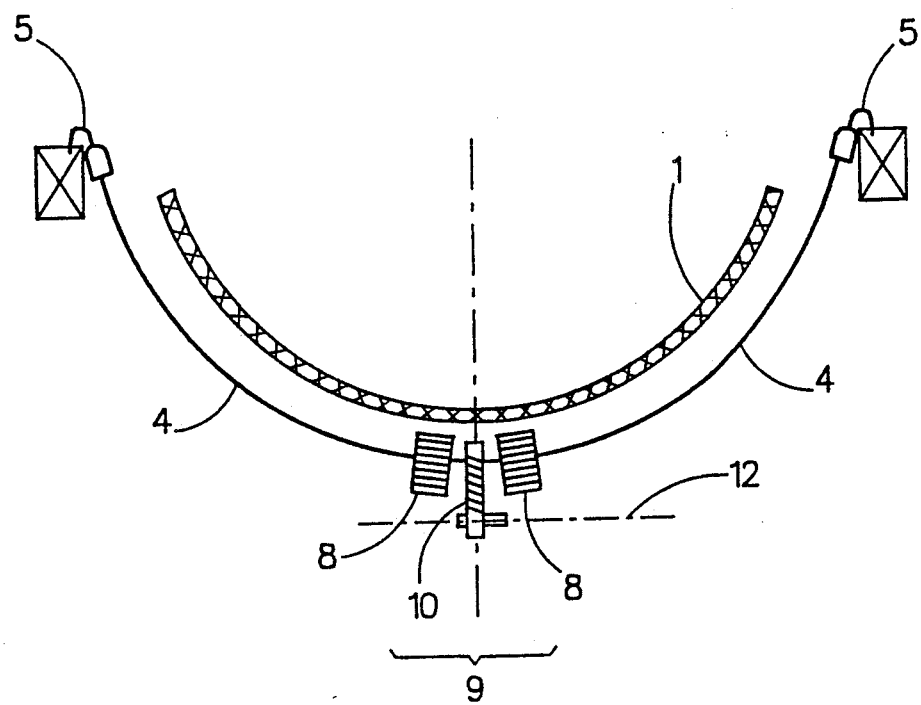
FIG. 2a

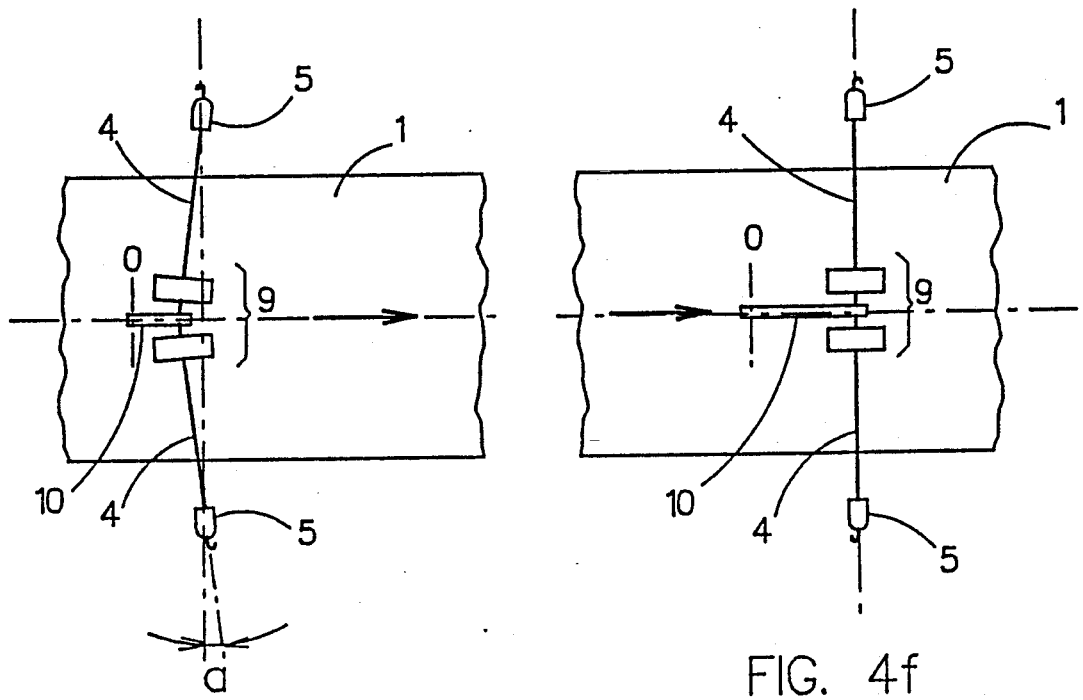
FIG. 4e   FIG. 4f
FIG. 5
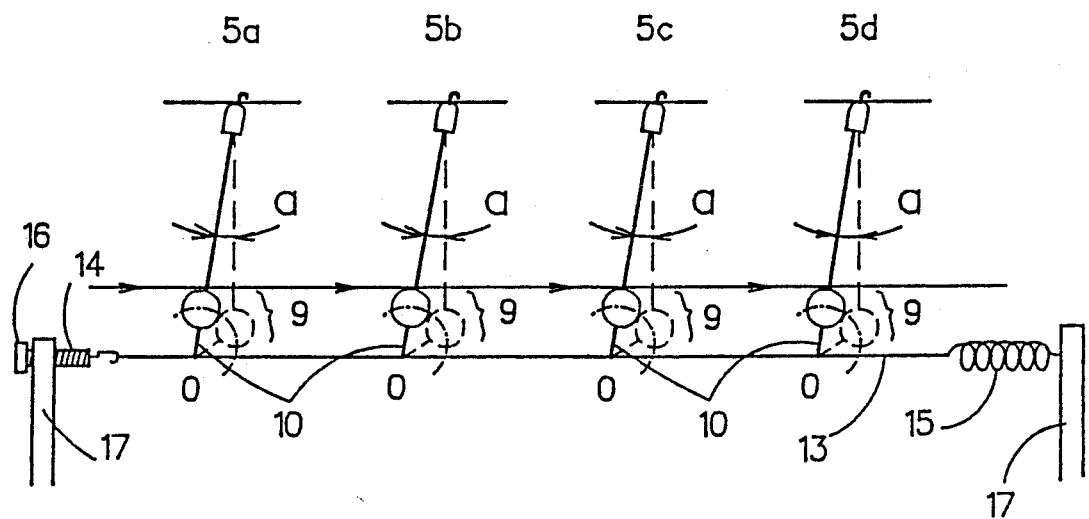

BELT CONVEYOR HAVING AN AUTOMATIC BELT CENTERING DEVICE AND THE CENTERING DEVICE THEREFOR

BACKGROUND OF THE INVENTION

1. Field of the Invention

This invention relates to the continuous transport of materials by conveyor belts. In particular, this invention relates to high-performance conveyor belts which are formed into a trough and which are supported by flexible elastic rollers.

2. Background Information

Conveyor belts are often used for the transport of materials in bulk, and quite often those conveyor belts need to be able to transport material of very varied dimensions, or "whatever comes along". For the transportation of materials in quarries, for example, conveyor belts of various lengths are often used, which lengths can be from several meters to several kilometers long in one continuous segment. Continuous belts for use in such situations often are constructed with a reinforcement casing which can be made of textile or metal, and such belts are generally supported at various intervals by small-diameter rotating rollers mounted on roller bearings. The spacing interval for such rollers is generally determined as a function of the load which the belt will carry, and of the tension exerted on the belt at any given point.

U.S. Pat. No. 2,271,166 to Weiss discloses one example of support rollers for supporting a conveyor belt. U.S. Pat. No. 2,271,166 essentially relates to an easily replaceable roller packing, which packing can be replaced without expensive disassembly of the entire roller structure. The separate rollers form the contact surface of each of the rigid rollers, while the rigid rollers support the separate rollers by means of several removable rims.

It is known that the formation of a conveyor belt into a trough-shaped cross-section can result in an increase in the capacity of the material transported on conveyor systems. The prior art of troughing a conveyor belt consists of mounting two rigid cylinders at a significant angle from the horizontal so that the two cylinders are able to idle on their shafts. These two cylinders are generally oriented symmetrically in relation to the axis of the belt.

To clarify the terminology which is used in this application, the term "roller" will generally be used for individual elementary support cylinders, and the term "rigid support" will be used to refer to the fastening parts for supporting the roller bearings and the set of two or three rollers, essentially contained in the same vertical plane, orthogonal to the longitudinal direction of the belt.

When two rollers are used to support and trough a belt, the two rollers are generally arranged in a "V"-shape in a vertical plane. This arrangement produces a small-radius curvature in the belt at the place where the two rollers meet. The load also accumulates in this area, and this causes local fatigue to the reinforcement casing. This fatigue is most noticeable in the zones where the longitudinal slope changes.

It has become apparent that it is necessary to use a third horizontal roller for supporting the center of the load, thereby forming a trough having a trapezoidal shape. Use of this third roller in the center shifts the area of curvature, which has a lower degree of curvature, into two intermediate zones of the belt. A description of an assembly forming such a rigid support is given in Great Britain Patent No. 1 000 094 to Woodhead. This patent shows that the central roller can be slightly offset, so that the central roller can be wider than the gap located between the oblique rollers.

Great Britain Patent No. 1 000 094 also discloses the use of flexible rollers in the form of coil springs connecting two roller bearings. Such rollers make possible a more gradual curvature which allows a belt of up to 1.80 meters wide to be used.

Such wide conveyors, however, have a tendency to lose the alignment between the flexible belt and the axis of the conveyor or the axis of the frame supporting the rigid supports or the flexible supports of the conveyor. Great Britain Patent No. 797 422 to Sutcliffe discloses a balancing device which equalizes the tension of flexible rollers. These flexible rollers consist of a flexible mandrel fastened to two bearings, with a connecting means, declared necessary, for the rotational connection of the flexible springs by universal joints, either between two rollers in a "V", or with the interposition of a horizontal roller at the center of the wide trough conveyor. Such a connecting device, however, essentially does not seem to have been generally adopted by other conveyor manufacturers.

When the rollers of a support remain rigid, a stable centering can essentially be obtained by a slight toe-in angle in relation to the vertical plane orthogonal to the belt. This toe-in gives the axis of the rollers, already inclined at 30 degrees from the horizontal, for example, an angle of 1.5 to 3 degrees from the vertical plane orthogonal to the belt.

Determined experimentally, this "toe-in" angle between vertical planes containing the rollers, induces a force toward the axis, which force is greater on the side which is more heavily loaded, tending to satisfy a trajectory in stable equilibrium when these components are balanced. An exaggerated positive toe-in, however, compresses the width of the belt, with a tendency to reduce the radius of curvature of the trough, and above all, results in a tendency to increase the resistance to the forward motion of the loaded belt, thus requiring excessive drive force to move the belt.

French Patent No. 2 267 961 to Valcalda, the inventor of the present application, combines the advantage of flexible rollers with a device designed to remedy the disadvantage of the negative toe-in exhibited under the action of the resistance to rolling. Because the rollers are driven, in an oblique plane, by the movement of the load, which movement causes instability under high load, the load capacity is limited.

Flexible rollers, one per support, make possible an economical catenary suspension of each of their external bearings, are driven in the direction of movement, and cause a negative toe-in, which causes instability of the conveyor belt. To make possible both high speeds and a deeper trough, which constitute the two requirements for a large flow capacity of material, French Patent No. 2 267 961 proposes the use of two flexible rollers per conveyor support, overlapped so that the asymmetrical toe-ins of each one are balanced out in a stable elastic recall for the loaded belt.

To do this, the internal stationary points of the two flexible rollers, which are necessarily overlapped (or supplemented by a third, horizontal, flexible roller, under the central portion of the load), are located significantly lower than the external fastening points. This French patent describes the possibility, since each flexible roller is itself no longer symmetrical in relation to the axis of the belt, of slightly shifting its own stationary points in the direction of movement, to produce, even before the appearance of the rolling resistance, a positive toe-in, which is a source of stability for the belt, as when the rollers are rigid.

The limitation to the benefit offered by the solution of French Patent No. 2 267 961 is that the stability in question, which is provided by the disclosed rollers when the belt is empty, increases further under the effect of a load, which load curves said flexible rollers. As a result, the toe-in effect, which is thereby increased, is accompanied by a prohibitive rolling resistance. It is therefore necessary to find an experimental compromise between the self-stability necessary primarily for the empty belt, e.g. when a great deal of tension is applied during start-up or when the loading begins, and an excessive stability when the belt is loaded, which load causes curvature of the flexible rollers. Under a load, and as a result of the increased curvature, the trajectory at each point of the rollers is therefore no longer strictly in the same direction, causing parasite frictions between the roller and the belt.

The prior art described above therefore leads to a contradiction between the ability to increase the width and the depth of the trough to improve the flow capacity of a conveyor, and the expenditure of the minimum energy necessary to guarantee the rolling required to reach satisfactory belt speeds.

In an attempt to preserve safety during empty phases of the conveyor operation, the effort to increase stability when the belt is both empty and under load, in effect, leads to an increase in energy consumption and in wear.

OBJECT OF THE INVENTION

The object of the invention is therefore to propose a solution which does not require a compromise between energy use, wear, and carrying capacity, which solution is a relatively simple device that ensures the optimum toe-in both when the belt is empty and when it is loaded, and which solution results in an increase in the performance of a conveyor system.

SUMMARY OF THE INVENTION

The present invention provides an automatic centering device for a flexible conveyor belt on a flexible conveyor belt conveyor. The conveyor belt is preferably supported by two rows of flexible rollers which trough the conveyor belt and essentially ensure a toe-in angle which recalls the belt toward a stable dynamic equilibrium on the axis of the conveyor. The invention also provides a simple means for experimentally adjusting the toe-in of the rollers in the most critical zones of the belt.

The invention is characterized by a central roller fastening which is located lower than the external roller fastening points, and is common to each pair of flexible rollers. When the height of the central fastening varies with the load being supported on the conveyor belt, this central fastening is preferably capable of moving in a curved trajectory by rotation around a fixed axis of a privotable lever which holds the central fastening. This arrangement essentially results in the variable alteration of the toe-in angle when the load being carried changes, i.e. the toe-in angle is reduced when the load increases.

Flexible rollers are defined as all forms of rollers in a substantially string form, whether this string form consists of cables, mechanical joints, or flexible and elastic joints made of rubber intimately bonded to metal.

A variant of the invention also makes it possible to adjust the position of the stationary point, about which point the pivot lever rotates, for a number of flexible supports which constitute a zone of a single point of the conveyor which exhibits a unique behaviour in comparison to adjacent zones.

One aspect of the invention resides broadly in a belt conveyor for the transport of a load of materials, the belt conveyor comprising: first and second pulley devices spaced a distance from one another; an endless belt disposed about the first and the second pulley devices, the endless belt having a first side, a second side and a longitudinal axis disposed along a length of the belt; a plurality of support apparatus spaced apart from one another at intervals in a direction along the longitudinal axis of the belt, each of said plurality of support apparatus for supporting the endless belt thereon over the distance between the first and the second pulleys; each of the plurality of support apparatus having a first side, a second side and a central portion disposed therebetween, and each of the plurality of support apparatus extending generally continuously from the first side of the belt to the second side of the belt in a direction generally transverse to the longitudinal axis of the belt; a device for retaining each of the plurality of support apparatus; the device for retaining being for disposing each of the plurality of support apparatus at a toe-in angle; and a device for variably altering the toe-in angle of each of the plurality of support apparatus in relation to the load placed upon the belt to decrease the toe-in angle as the load increases.

Another aspect of the invention resides broadly in an automatic centering device for centering a conveyor belt on a plurality of support apparatus for supporting the conveyor belt, which conveyor belt is for carrying a load and has a first side, a second side, and a longitudinal axis disposed along a length thereof, each of the plurality of support apparatus extends generally continuously from the first side of the belt to the second side of the belt in a direction generally transverse to the longitudinal axis of the belt, the centering device comprising: a device for retaining the support apparatus; the device for retaining being for disposing the support apparatus at a toe-in angle; and a device for variably altering the toe-in angle of the support apparatus in relation to the load placed upon the belt to decrease the toe-in angle as the load increases.

BRIEF DESCRIPTION OF THE DRAWINGS

The invention is explained in greater detail below, with reference to the accompanying drawings, in which:

FIGS. 1a–1h, 1j and 1k show several diagrams of both rigid supports and flexible supports of the prior art;

FIG. 2a is a diagram of the device in accordance with the present invention;

FIGS. 4a–4f consist of several diagrams showing the operation of the present invention in the presence and absence of a load; and FIG. 5 shows an adjustment device for the stationary point of the central fastening.

DESCRIPTION OF THE PREFERRED EMBODIMENTS

Figure 1:
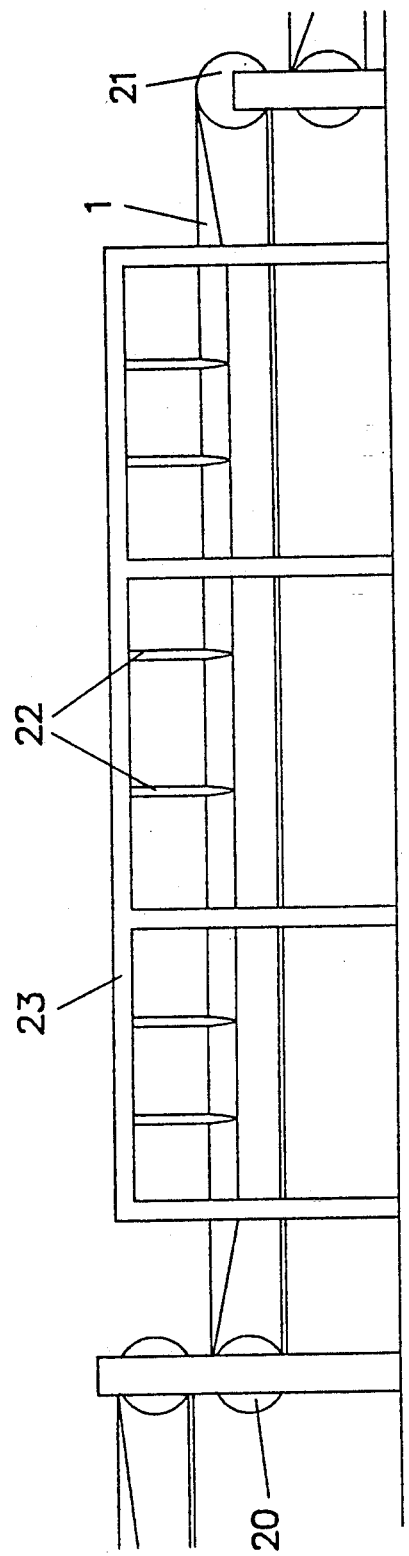
FIG. 1 shows a conveyor system.

FIG. 1 shows a conveyor system for conveying materials over a distance. Such a conveyor system essentially has at least a first pulley 20 spaced apart from a second pulley 21, and the conveyor belt 1 typically extends around each of these two pulleys 20, 21. To support the conveyor belt between the two pulleys, there can be a number of belt supports 22 spaced at intervals between the pulleys 20, 21. These supports 22, in turn, generally are supported by some sort of framework 23, or cable system (not shown) which extends along at least a substantial portion of the length of the conveyor belt. If desired, a number of such conveyor systems (shown in part) can be aligned to transport materials over a great distance.

Figure 1A:
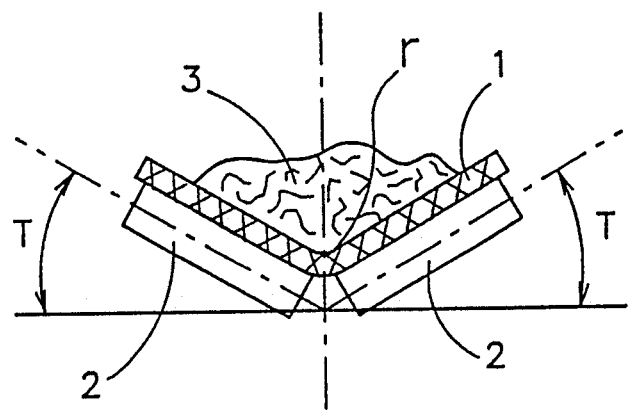
Figure 1B:
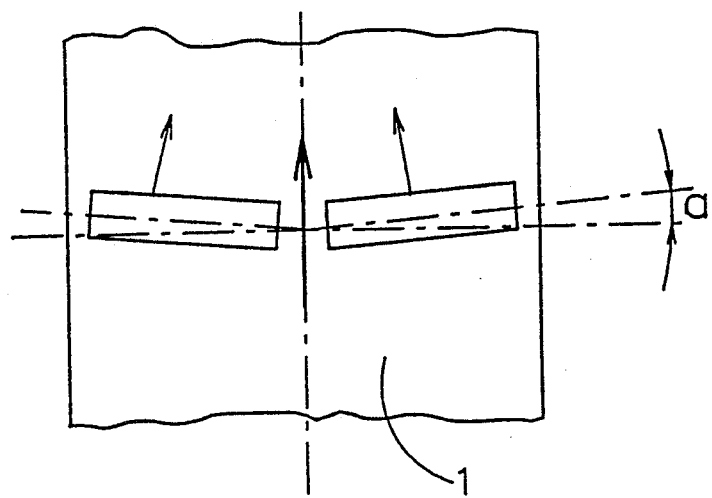

FIGS. 1a, 1b and 1c show the angles applied to two rigid rollers arranged in a "V", seen in a cross section orthogonal to the belt in FIG. 1a, and shown schematically in plan view in FIGS. 1b and 1c.

The conveyor belt 1 is supported by two rigid rollers 2, symmetrically forming a trough angle (T), e.g. 30 degrees from the horizontal, which trough angle increases the transport capacity, while also resulting in an accumulation of the load transported 3 toward the center of the belt. At the center of the belt, a radius of curvature (r) is formed, which radius of curvature (r) is smaller under the action of the load than the radius of curvature required by the rigidity of the belt when it is empty.

In particular, when the belt is empty, the belt, curved at an essentially constant radius, has essentially no need to be recalled toward equilibrium, because the belt is supported tangentially by the oblique rigid rollers 2.

To improve stability, a recall component is provided by a slight angle (a) shown in the overhead views of FIGS. 1b and 1c.

FIG. 1b shows a positive toe-in in the direction of movement of the conveyor, which positive toe-in provides a stabilizing effect to the centering movement of the conveyor belt. FIG. 1c shows a negative toe-in in the direction of movement of the conveyor, which negative toe-in provides an unstable effect on the centering of the belt.

Any load, the force of which is exerted via the belt on the support rollers, significantly increases any stabilizing effects caused by positive toe-ins. The slight angle (a) must typically be limited to angular values of about 1.5 degrees to about 3 degrees, to avoid, under load conditions, any excessive energy consumption or excessive wear of contacting elements. At angles greater than about 3 degrees, such excessive energy consumption and wear would be caused by increased friction under the action of the difference of trajectory between the conveyor belt 1, which can move in the direction of the longitudinal arrow of the conveyor belt, and its support elements, which are the rigid rollers 2, indicated by the roller arrows.

FIG. 1d shows a cross section orthogonal to a belt supported by three rollers, and FIG. 1e, in a plan view, shows the most generalized improved solution employing three rigid rollers 2. In this configuration, a widened, trapezoidal trough shape of the belt, increases the cross section supporting the load transported. FIG. 1e indicates the stabilizing effect contributed by the positive toe-in of the slight angle (a), even if the centripetal component exerted on the conveyor belt 1 has a tendency to reduce the radii of curvature under the action of the load between the rigid rollers 2. FIG. 1d shows an empty conveyor installation, where the conveyor belt 1 has a curved trough with an almost constant radius (R). This curve is a result of the action of the inherent rigidity of the belt 1, which rigidity is almost tangent to the oblique rollers.

FIG. 1f shows an orthogonal cross section of a conveyor belt 1 supported by a flexible roller 4. Such a flexible roller 4 is suspended simply by two external fastening points 5 on the conveyor frame.

The flexible rollers 4 consist either of a reinforced rubber tube, as disclosed by Great Britain Patent No. 797 422, a metal spring wound into a coil, as described by Great Britian Patent No. 1000 094, or by rubberized rollers molded over a metal cable core, as disclosed by French Patent No. 2 267 961.

The slightest resistance to rolling, which is of course increased by the load transported 3, causes a driving of the flexible roller 4 in the direction of movement of the conveyor, which driving effect, as illustrated in the overhead view in FIG. 1g, causes a negative toe-in of angle (a). Such a negative toe-in is essentially equivalent to that as shown for the rigid rollers illustrated in the diagram in FIG. 1c. The instability generated by the negative toe-in is increased by the load, and thereby limits the possibilities of increasing the load being transported. The gradual trough formation made possible by the use of flexible rollers might otherwise allow the load to be increased.

Figures 1H, 1J:
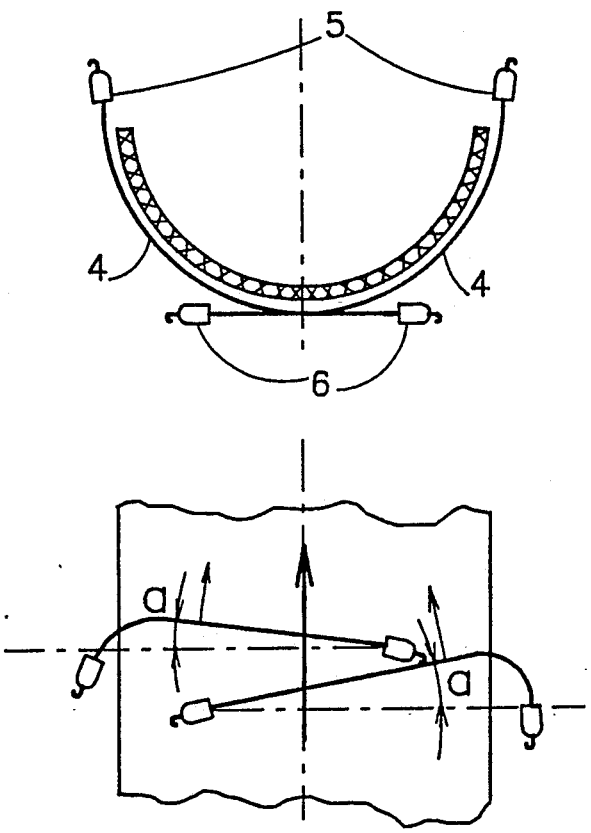

FIG. 1h, in orthogonal section, and FIG. 1j, in plan view, show the roller configuration that was proposed by French Pat. No. 2 267 961. In this configuration, a single flexible roller 4, as described above, is replaced with two similar flexible rollers 4. These two flexible rollers 4 are generally fastened to the frame of the conveyor by the same external fastening points 5, and, are slightly overlapped in the direction of movement of the belt as a result of the internal fastening points 6 which are fastened to the frame of the conveyor.

The drive in the direction of movement of the conveyor belt, shown by the longitudinal conveyor arrow in FIG. 1j, imparts an asymmetrical curvature to the two flexible rollers 4. The overall effect of this asymmetrical curvature, indicated by the equivalent angle (a), is of the same type as the positive toe-in shown for the rigid rollers in FIG. 1b. The arrangement of FIG. 1j therefore acts in the direction of stabilization. French Patent No. 2 267 961 claims the capability of imparting to the flexible rollers 4 a permanent positive toe-in, which is essentially useful only when the belt is empty. The increase in the effect caused by the toe-in, under load, is unfavorable but controllable, in a unique manner, by the more or less significant action of the drive in the direction of operation, as a function of the amount of the overlap.

FIG. 1k shows greater detail of the embodiment illustrated in FIG. 1h, which embodiment has the additional disadvantage that it requires the realization of a special frame 7 to support the internal fastening points 6.

The roller bearings 8, which connect the internal fastening points 6 to their respective flexible rollers 4, are in an alignment which can vary with the load, and thus limit their fatigue strength.

Figure 2B:
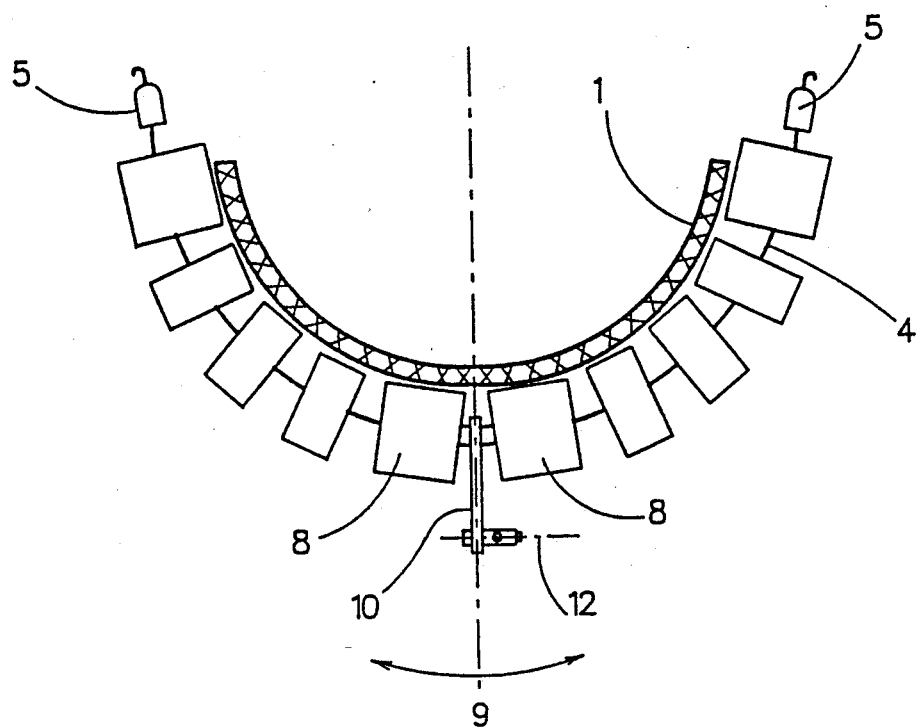
FIG. 2b shows one embodiment of the present invention.

FIGS. 2a and 2b illustrate one embodiment of the fastening arrangement according to the present invention. FIG. 2a is a schematic diagram showing the existence of a central fastening 9 on each pair of flexible rollers.

Figure 3:
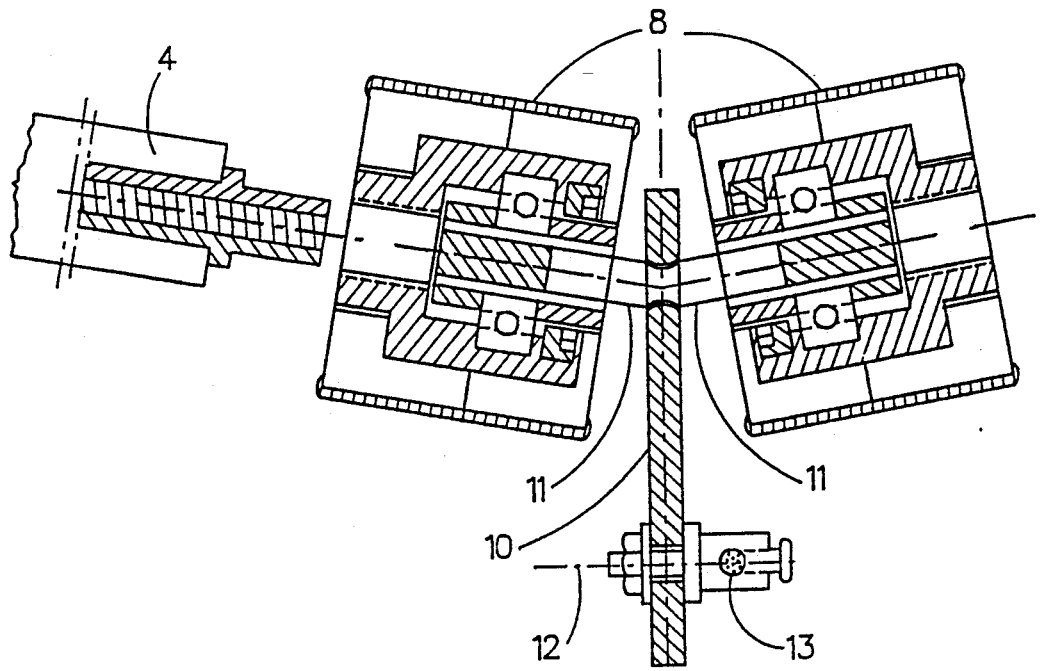
FIG. 3 is a detailed cross section of the central fastening.

FIG. 2b shows one embodiment of the invention and FIG. 3 shows a detailed cross section of the central fastening 9. This embodiment of the present invention is further described below with reference to the FIGS. 2a, 2b, and 3.

The conveyor belt 1 is preferably curved gradually into a trough shape as a result of the suspension of the conveyor belt 1 on the pair of flexible rollers 4, which flexible rollers 4 are preferably suspended on the conveyor chassis only by the two external fastening points 5. The two flexible rollers 4, which are preferably disposed in the same plane, would essentially behave as a single, pendulum roller, without the inclusion of the central fastening 9 which essentially connects the roller bearings 8 to one another.

The central fastening 9 can preferably be formed by a pivotable lever 10, and the internal axes of the roller bearings 11 can preferably be attached to this pivotable lever 10 at an appropriate angle.

The pivotable lever 10 is preferably rotatably attached to a rigid rod or cable 13 (shown in FIG. 5), which rigid rod or cable is preferably attached at two points, preferably its extremities, to the stationary chassis or frame of the conveyor. By means of this attachment to the rod or cable 13, the pivotable lever 10 is essentially free to pivot, or rotate, around a stationary axis 12 as the equilibrium height of the conveyor belt varies. On account of the pendulum-like swinging of the flexible support assembly of FIG. 2, around the two fixed suspension points on the chassis of the conveyor, which two fixed suspension points essentially consist of the external fastening points 5, the toe-in equivalent to that of the rigid rollers as discussed for FIG. 1b is variable.

One embodiment of the invention essentially allows for the selection of the stationary points about which the lever 10 rotates, the selection of the length of the flexible rollers 4 between the stationary points, and the arrangement of the lever 10. In this manner, a positive toe-in, can be deliberately set, on the basis of an experimental adjustment which may be different in individual segments of the conveyor belt, to be at its maximum when the belt is empty, and, is preferably reduced, during conveying of a load, to an optimal value, which optimal value may be zero at the maximum allowable load.

FIGS. 4a–4f show the variations of shape of the flexible supports, as a function of load circumstances.

Figure 4A:
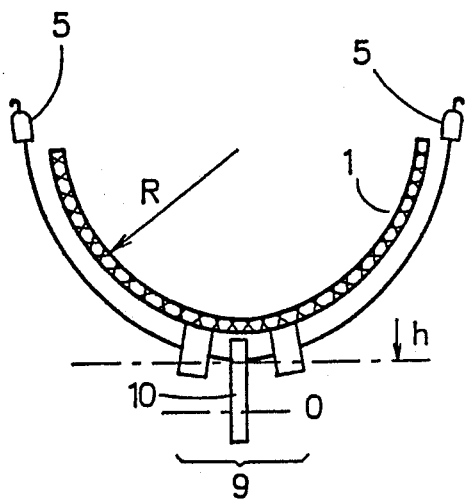
Figure 4B:
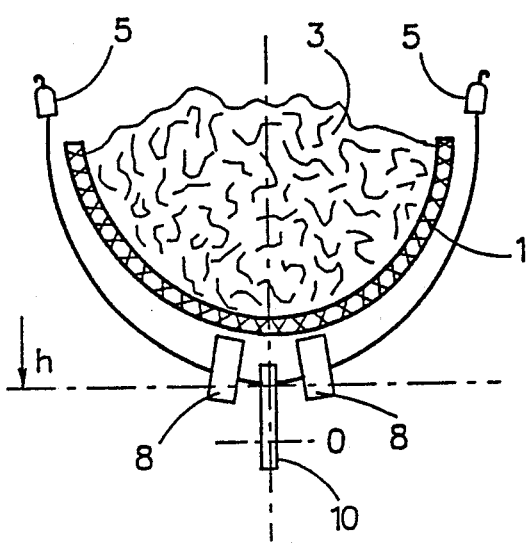

FIGS. 4a and 4b, schematically illustrate two orthogonal cross sections of the belt. FIG. 4a shows operation of the present invention when the belt is empty, and FIG. 4b shows the operation when the conveyor belt 1 is supporting the maximum load carried 3. In FIG. 4a, the natural rigidity of the conveyor belt 1, and its pendulum suspension, as a result of the flexible rollers hooked to the external fastening points 5, gives the assembly essentially the shape of a half-circumference with an approximately constant radius (R).

The effect of the load 3 being transported, shown in FIG. 4b, generally lowers the central fastening 9 by a height difference (h), which height difference increases with the load. This lowering essentially results in a redistribution of the load primarily toward the center, and makes the flexible assembly consisting of the belt and the rollers assume a catenary shape which is essentially parabolic.

Figure 4C:
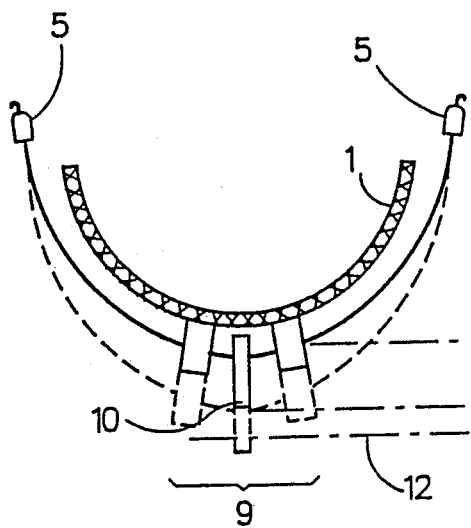
Figure 4D:
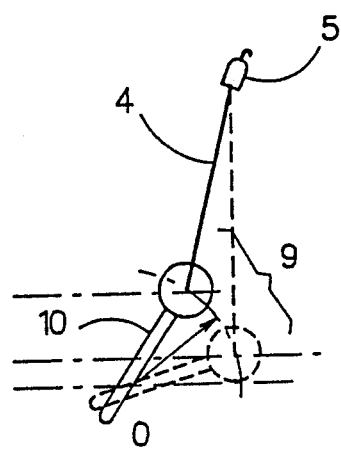

FIGS. 4c and 4d show the behavior of the belt for an intermediate value of the load. FIGS. 4c and 4d show the curved trajectory imposed on the central fastening 9 by the rotation of the swinging lever 10 around the stationary axis 12. The swinging lever 10 essentially supports the central fastening 9. The corresponding variable equivalent toe-in is shown in plan view in FIGS. 4e and 4f, which correspond to the extreme load cases, i.e., FIG. 4e corresponds to the cross section shown in FIG. 4a, where the belt is empty and FIG. 4f corresponds to the cross section shown in FIG. 4b, where the load is maximum. In FIGS. 4b and 4f, when the load is maximum, the toe-in is reduced from the initial value (a) to a value of almost zero. This reduction of the toe-in to about 0 results in a reduction of the friction values, and thus, a reduction in the power consumed.

The stationary point 0 in FIG. 4d, which point 0 represents the stationary axis 12 of FIG. 4c, is preferably attached longitudinally in relation to the external fastening points 5. In addition, the parasite friction components generated by the minimal differences in trajectory at each point of the flexible rollers 4 supporting the conveyor belt 1, drive the equilibrium toward a vertical orientation, where the friction becomes minimal. An additional special feature of the invention is that it takes advantage of this orientation, which is more advantageous than the solutions proposed by the prior art, where a special frame is needed to support, in an overlapping fashion, the internal fastening points of two flexible rollers. If the stationary point 0 is held by means of a longitudinal axis, without transversal rigidity, catenary balancing of the flexible support is possible, even in case of temporary asymmetry of the load being transported. If a temporary asymmetry is present, the central fastening 9 can be deflected in the transverse direction, since it is preferably attached by a stationary point 0 having almost no recall rigidity toward the center of the belt.

Such a transverse deflection can also result in a slight possibility of angular deflection of the internal axes of the roller bearings, which ability to deflect is more favorable to the fatigue behavior of the roller bearings than if they were rigidly fastened to a special frame as in the prior art.

In addition, the centering of the stationary point 0, and thus of the entire central fastening 9, can preferably be accomplished by natural equilibrium during assembly, without requiring any adjustment of the internal fastening points which are supported by the central fastening 9, and without a need for a special frame mounted rigidly on the chassis of the conveyor.

FIG. 5 shows a diagram of one possible adjustment device, connecting the stationary points 0 of several flexible supports according to the present invention. Each such adjustment device is preferably located in the vicinity of a zone of a singular point of the conveyor. Such zones of a singular point consist in particular of segments in the conveyor which have changes in the slope of the longitudinal profile for a conveyor belt having a complex geometry. Such segments can generally be classified as concave, or center up when the slope increases, and convex, or center down when the slope decreases.

The concave zones, with the center "up", are constituted by several supports where the absolute value of the slope increases, and then descends to zero or a positive value.

In these concave zones, when the belt tension is increased at start-up or during the beginning of loading, a belt which is not heavily loaded has a tendency to separate from the rollers which support it, and the equivalent toe-in of the flexible rollers should then preferably be at the maximum. This toe-in should preferably decrease when the load arrives, since the trough-shaped belt exhibits two radii of curvature in the same direction at each point, and exerts significantly greater tension on the center of the belt than on its edges.

On the contrary, in the convex zones, with the "center down", that separate a positive slope from a reduced longitudinal slope, or from a zero or descending slope, opposite radii of curvature occur in the belt. In these convex zones, the set of several rigid or flexible supports exhibits an overall surface in the form of a diabolo (two cones facing one another at their tips), which diabolo shape is particularly stable for the belt, the edges of which belt are stretched to a greater degree than the center.

In this convex region, the equivalent toe-in must be the lowest, both when the belt is empty and when it is loaded.

The device illustrated in FIG. 5 makes it possible, when the conveyor installation is started up and even for corrections during operation, to make a precision adjustment of the position of the stationary points 0. As shown in FIG. 5, which depicts four individual supports, the adjusting device can be connected to simultaneously adjust the position of a number of the stationary points 0 for a number of supports.

These different stationary points 0 can be longitudinally connected by a common cable, which plays the part of the longitudinal axis 13 preferably stretched between an adjustment screw 14 and a tension spring 15, which can be permanently attached to the frame of the conveyor by a nut or a thread 16 and a hook 17.

Since the supports are typically several meters apart, the stationary points 0 can have a certain latitude for transverse centering under the action of an asymmetrical load. Such a centering can require a slight lateral swinging or rocking of the central fastenings 9.

The common cable forming the longitudinal axis 13 preferably passes, for example, through a hole located on each fixed axis 12 where a screw makes it possible, during installation, to adjust the intervals between the stationary points 0 by tightening the cable, which is preferably only a few millimeters in diameter. The transverse distances between the various stationary points 0 exert low-intensity elastic recall forces on each pivot lever 10.

On the other hand, the constant radius trajectory of each of the pivot levers 10 around each fixed axis, schematically represented by the point 0, can be adjusted with precision by rotation of the adjustment screw 14 in the nut or thread 16, to reduce the toe-in when the load increases. It thus becomes possible to make corrections for creep, or to make corrections for variations in the tension of the conveyor belt caused by temperature. The device, which is preferably only fastened to the frame of the conveyor for each flexible support by the two external fastening points 5a, 5b, 5c, or 5d, therefore even makes possible an installation locally suspended by cables, according to an extremely lightweight arrangement, making it possible to span great distances without intermediate support points, all the while retaining a finely-adjustable stability of operation (it is sufficient if the pivot levers 10 are of significant length in relation to the deflection assumed by the installation).

Other arrangements, which can be standarized, can be adopted over major straight-line portions of a conveyor by preferably installing long rods forming the longitudinal axis 13, which rods can then serve as the adjustment device for the adjustment of the toe-in.

Such a device also makes possible an experimental adjustment of the optimal values of equivalent toe-in of the flexible rollers both when empty and under load, while achieving the lowest possible values of rolling resistance of the installation, and thus the lowest possible values of energy consumed.

A technician skilled in the art can naturally combine the various advantages, achieved by the invention, to the various sectors of a conveyor. The toe-in adjustment may also be automated, as a function of the measurement of the energy necessary for the translation.

One feature of the invention resides broadly in an automatic centering device for a troughed belt 1 on a flexible conveyor belt, which belt 1 is supported by two rows of flexible rollers providing a toe-in angle which recalls the belt to a stable dynamic equilibrium on the axis of the conveyor, characterized by the fact that a central fastening 9, located lower than the external fastening points 5 and common to each pair of said flexible rollers 4, when its altitude varies with the load, is given a curved trajectory, by rotation around a fixed axis 12 of the toggle lever 10 which supports said central fastening 9, to reduce the toe-in angle (a) when the load being transported 3 increases.

Another feature of the invention resides broadly in an automatic centering device on flexible conveyor belt, characterized by the fact that the fixed axes 12 of several sets of flexible supports are connected to one another by a longitudinal axis 13 which is held taut between an adjustment screw 14 and a tension spring 15, which are themselves permanently attached to the frame of the conveyor.

Yet another feature of the invention resides broadly in an automatic centering device on flexible conveyor belt, characterized by the fact that the trajectory of the central fastening 9 rotating around the fixed axis 12 is adjusted so that the toe-in (a) is cancelled out for the maximum value of the load transported 3.

A yet further feature of the invention resides broadly in an automatic centering device on flexible conveyor belt, characterized by the fact that the rotation of the adjustment screw 14 is a nut or thread 16, which is stationary in relation to the frame of the conveyor, makes possible the adjustment of the optimal compromise between the stability of the belt when empty and the stability of the belt when under load, resulting in the lowest possible values of resistance to rolling, and therefore the lowest absorbed energy.

A still yet further feature of the invention resides broadly in an automatic centering device on flexible conveyor belt, characterized by the fact that the longitudinal axis 13 is a cable fixed by an adjusting screw to each fixed axis 12 which it connects longitudinally, allowing a deflection of the central fastenings 9 in the transverse direction under the asymmetrical action of the load being transported 3.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A belt conveyor for the transport of a load of materials, said belt conveyor comprising:
    first and second pulley means spaced a distance from one another;
    an endless belt disposed about said first and said second pulley means, said endless belt having a first side, a second side and a longitudinal axis disposed along a length of the belt;
    a plurality of support means spaced apart from one another at intervals in a direction along the longitudinal axis of said belt, each of said plurality of support means for supporting said endless belt thereon over the distance between said first and said second pulleys;
    each of said plurality of support means having a first side, a second side and a central portion disposed therebetween, and each of said plurality of support means extending generally continuously from the first side of the belt to the second side of the belt in a direction generally transverse to the longitudinal axis of said belt;
    means for retaining each of said plurality of support means;
    said means for retaining being for disposing each of said plurality of support means at a toe-in angle;
    means for variably altering the toe-in angle of each of said plurality of support means in relation to the load placed upon the belt to decrease the toe-in angle as the load increases;
    said means for retaining comprising a plurality of levers, one each of said plurality of levers being connected to one each of said plurality of support means, each said lever having a first end connected to said central portion of a corresponding one of said support means;
    said first end of each said lever being pivotable about a point in a direction along the longitudinal axis of said belt, said point defining a pivot axis, and said pivot axis being substantially perpendicular to said longitudinal axis; and
    means for adjusting a position of said pivot point of each said lever means to adjust said toe-in angle to a predetermined value for the load placed upon the belt.

2. The belt conveyor according to claim 1, wherein each of said plurality of support means comprises at least one flexible support roller, and each of said flexible support rollers forms a cross-section of said belt into a trough.

3. The belt conveyor according to claim 2, wherein each of said plurality of support means comprises two support rollers connected together at said central portion of said support means by a fastening means.

4. The belt conveyor according to claim 3, wherein said first end of each said lever is connected to said fastening means at said central portion of said corresponding one of said support means.

5. The belt conveyor according to claim 4, wherein:
    said pivoting of said lever occurs as a function of the load on the belt; and
    said pivoting of said lever variably alters said toe-in angle from a maximum positive toe-in angle when the belt is empty to a toe-in angle of about zero when the belt is loaded to capacity.

6. The belt conveyor according to claim 5, wherein said predetermined value is about zero and said means for adjusting a position of said pivot point of each said lever means comprises means for adjusting said pivot point to adjust said toe-in angle to about zero when said belt is loaded to capacity.

7. The belt conveyor according to claim 5, further including:
    frame means for bearing each of said plurality of support means;
    means for connecting together the fixed pivot points of at least two of said plurality of levers, said means for connecting extending substantially along at least a portion of said conveyor belt in a direction substantially along the longitudinal axis, said means for connecting having a first end and a second end;
    resilient member means for connecting said first end of said means for connecting to said frame means; and
    means for adjusting said means for connecting to variably alter a position of the pivot points connected to said means for connecting together to thereby adjust the toe-in angle to substantially zero under a capacity load to provide minimum resistance to rolling of the flexible rollers.

8. The belt conveyor according to claim 7, wherein said means for connecting comprises at least one of: a cable, a rod and a bar; and
    said second end of said means for connecting comprises said means for adjusting, and said means for adjusting comprises a threaded portion retained on said frame means by a threaded nut.

9. The belt conveyor according to claim 8, wherein said means for adjusting comprises said cable means, and said cable means is deflectable in a direction transverse to said longitudinal axis during conveying of a load having an asymmetrical cross-section in said trough.

10. The belt conveyor according to claim 7, wherein:
    said frame means comprises cable means for bearing said support means;
    said ends of each said support means are fixedly attached to said cable means; and
    said central portion of each said support means is movable in relation to said ends of each said support means to alter said toe-in angle.

11. An automatic centering device for centering a conveyor belt on a plurality of support means for supporting the conveyor belt, which conveyor belt is for carrying a load and has a first side, a second side, and a longitudinal axis disposed along a length thereof, each of the plurality of support means extends generally continuously from the first side of the belt to the second side of the belt in a direction generally transverse to the longitudinal axis of the belt, said centering means comprising:

means for retaining the support means;

said means for retaining being for disposing said support means at a toe-in angle;

means for variably altering the toe-in angle of the support means in relation to the load placed upon the belt to decrease the toe-in angle as the load increases;

said means for retaining comprising a plurality of levers, one each of said plurality of levers being connected to one each of said plurality of support means, each said lever having a first end connected to said central portion of a corresponding one of said support means;

said first end of each said lever being pivotable about a point in a direction along the longitudinal axis of said belt, said point defining a pivot axis, and said pivot axis being substantially perpendicular to said longitudinal axis; and means for adjusting a position of said pivot point of each said lever means to adjust said toe-in angle to a predetermined value for the load on the belt.

12. The centering device according to claim 11, wherein each of said plurality of support means comprises at least one flexible support roller, and each of said flexible support rollers forms a cross-section of said belt into a trough.

13. The centering device according to claim 12, wherein:

each of said plurality of support means comprises a first end, a second end, and a central portion disposed therebetween; and each of said plurality of support means comprises two support rollers connected together at said central portion of said support means by a fastening means.

14. The centering device according to claim 13, wherein said first end of each said lever is connected to said fastening means at said central portion of said corresponding one of said support means.

15. The centering device according to claim 14, wherein:

said pivoting of said lever occurs as a function of the load on the belt; and said pivoting of said lever variably alters said toe-in angle from a maximum positive toe-in angle when the belt is empty to a toe-in angle of about zero when the belt is loaded to capacity.

16. The centering device according to claim 15, wherein said predetermined value is about zero and said means for adjusting a position of said pivot point of each said lever means comprises means for adjusting said pivot point to adjust said toe-in angle to about zero when said belt is loaded to capacity.

17. The centering device according to claim 15, further including:

frame means for bearing each of said plurality of support means;

means for connecting together the fixed pivot points of at least two of said plurality of levers, said means for connecting extending substantially along at least a portion of said conveyor belt in a direction substantially along the longitudinal axis, said means for connecting having a first end and a second end;

resilient member means for connecting said first end of said means for connecting to said frame means; and means for adjusting said means for connecting to variably alter a position of the pivot points connected to said means for connecting together to thereby adjust the toe-in angle to substantially zero under a capacity load to provide minimum resistance to rolling of the flexible rollers.

18. The centering device according to claim 17, wherein said means for connecting comprises at least one of: a cable, a rod and a bar; and said second end of said means for connecting comprises said means for adjusting, and said means for adjusting comprises a threaded portion retained on said frame means by a threaded nut.

19. The centering device according to claim 18, wherein said means for adjusting comprises said cable means, and said cable means is deflectable in a direction transverse to said longitudinal axis during conveying of a load having an asymmetrical cross-section in said trough.

20. The centering device according to claim 17, wherein:

said frame means comprises cable means for bearing said support means;

said ends of each said support means are fixedly attached to said cable means; and said central portion of each said support means is movable in relation to said ends of each said support means to alter said toe-in angle.

* * * * *